US011907117B2

United States Patent
Rath et al.

(10) Patent No.: US 11,907,117 B2
(45) Date of Patent: Feb. 20, 2024

(54) EFFICIENT METHOD TO DYNAMICALLY SELECT A PROTECTION DURATION FOR RETENTION LOCKING DEDUPLICATED OBJECTS

(71) Applicant: Dell Products L.P., Round Rock, TX (US)

(72) Inventors: Jagannathdas Rath, Bengaluru (IN); Kalyan C. Gunda, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/805,908

(22) Filed: Jun. 8, 2022

(65) Prior Publication Data

US 2023/0401151 A1 Dec. 14, 2023

(51) Int. Cl.
*G06F 12/02* (2006.01)
*G06F 16/11* (2019.01)

(52) U.S. Cl.
CPC ........ *G06F 12/0269* (2013.01); *G06F 16/125* (2019.01); *G06F 2212/702* (2013.01)

(58) Field of Classification Search
CPC ............... G06F 12/0269; G06F 16/125; G06F 2212/702
See application file for complete search history.

(56) References Cited

U.S. PATENT DOCUMENTS

| | | | |
|---|---|---|---|
| 5,526,524 A | 6/1996 | Madduri | |
| 6,301,616 B1 | 10/2001 | Pal et al. | |
| 7,212,731 B1 | 5/2007 | Morotomi et al. | |
| 9,588,977 B1 | 3/2017 | Wang et al. | |
| 9,912,752 B1 | 3/2018 | Davis et al. | |
| 9,959,280 B1 | 5/2018 | Whitehead et al. | |
| 10,540,508 B2 | 1/2020 | Byun et al. | |
| 11,347,698 B2 * | 5/2022 | Fretz | G06F 16/148 |
| 11,429,658 B1 | 8/2022 | Richter | |
| 2003/0093546 A1 | 5/2003 | Roy et al. | |
| 2005/0273568 A1 | 12/2005 | Blandy | |
| 2006/0020911 A1 | 1/2006 | Lyons | |
| 2007/0143792 A1 | 6/2007 | Acton et al. | |
| 2007/0162527 A1 | 7/2007 | Wright et al. | |
| 2010/0092160 A1 | 4/2010 | Bhogal et al. | |
| 2010/0318584 A1 | 12/2010 | Krishnaprasad et al. | |

(Continued)

FOREIGN PATENT DOCUMENTS

| | | |
|---|---|---|
| JP | 2010158038 A | 7/2010 |
| WO | 2009078870 A1 | 6/2009 |

(Continued)

*Primary Examiner* — Sean D Rossiter
(74) *Attorney, Agent, or Firm* — Workman Nydegger (57) ABSTRACT

Dynamically selecting a protection duration for locking objects in a storage. A garbage collection deletes objects over time. The objects may not be removed from storage until associated locks have expired. The length of the lock may impact the cost. A new lock extension value is selected each time a lock extension operation is performed. The lock extension value selection process accounts for a garbage collection operation cycle, an amount of deleted objects that are stored because of being locked, and a garbage collection churn. This allows an optimum lock extension value to be selected dynamically and repeatedly to control costs automatically.

20 Claims, 5 Drawing Sheets

(56) References Cited

U.S. PATENT DOCUMENTS

| | | | |
|---|---|---|---|
| 2011/0067084 A1 | 3/2011 | Byun et al. | |
| 2011/0225214 A1 | 9/2011 | Guo | |
| 2012/0066193 A1 | 3/2012 | King et al. | |
| 2017/0139824 A1 | 5/2017 | Dragoljevic et al. | |
| 2018/0089110 A1 | 3/2018 | Zhou et al. | |
| 2020/0326878 A1 | 10/2020 | Bora et al. | |
| 2020/0334143 A1 | 10/2020 | Noto et al. | |
| 2021/0103453 A1* | 4/2021 | Wang | G06F 9/526 |
| 2021/0165573 A1 | 6/2021 | Demoor et al. | |
| 2022/0114145 A1* | 4/2022 | Piao | G06F 16/1774 |
| 2022/0207005 A1 | 6/2022 | Chenthamarakshan et al. | |
| 2022/0222074 A1* | 7/2022 | Rath | G06F 11/0757 |
| 2023/0077938 A1* | 3/2023 | Yarlagadda | G06F 16/1752 |
| | | | 707/662 |
| 2023/0152996 A1* | 5/2023 | Kim | G06F 12/0246 |
| | | | 711/154 |

FOREIGN PATENT DOCUMENTS

| | | |
|---|---|---|
| WO | 2015085787 A1 | 6/2015 |
| WO | 2016148738 A1 | 9/2016 |

\* cited by examiner

| Garbage Collection Schedule | Protection Duration (Lock Extension Value) | Garbage Collection Churn | Lock Extensions |
|---|---|---|---|
| 7 days | 15 days | 10.5 TB | 12 |
| 7 days | 16 days | 10.5 TB | 11 |
| ... | ... | ... | ... |
| 7 days | 90 days | 10.5 TB | 2 |

Figure 4

| Garbage Collection Schedule | Protection Duration | Garbage Collection Churn | Extra Days | Number of Extentions | Overlaps | Total Cost | Monthly Average |
|---|---|---|---|---|---|---|---|
| 14 days | 59 Days | 30 TB | 451 ($2309) | 3 ($900) | 1 | $3209 | $535 |
| 14 days | 24 Days | 30 TB | 172 ($886) | 9 ($2700) | 1 | $3586 | $598 |
| 14 Days | 41 Days | 30 TB | 284 ($1454) | 5 ($1500) | 0 | $2954 | $492 |

EFFICIENT METHOD TO DYNAMICALLY SELECT A PROTECTION DURATION FOR RETENTION LOCKING DEDUPLICATED OBJECTS

FIELD OF THE INVENTION

Embodiments of the present invention generally relate to data protection operations and to controlling cost in data protection operations. More particularly, at least some embodiments of the invention relate to systems, hardware, software, computer-readable media, and methods for dynamically controlling data-related costs including costs associated with storing deleted data in a computing environment.

BACKGROUND

The cloud is increasingly used to store data. When data is written to the cloud, the new data may be automatically locked for a period of time. This is referred to as a protection duration. Over time, because data can become outdated, stale, or no longer required, garbage collection operations are often performed to clean up the cloud-based storage and remove data that is no longer needed. Performing garbage collection reduces the cost that would otherwise be incurred in storing data that is no longer needed.

This process is complicated when data is locked or otherwise protected. For example, the garbage collection process may identify data for deletion or removal. However, the data may be locked. As a result, the locked data cannot be removed. This incurs, at a minimum, a cost associated with storing data that is subject to deletion.

Further, before the protection duration expires, the locks on live objects may be renewed or extended for another period of time (the protection duration). Extending the lock on data can incur unnecessary cost. For example, setting a protection duration that is too short can lead to numerous lock extension cycles—each lock extension cycle incurs cost. If the extended protection duration is too long, deleted data may consume storage—this can unnecessarily increase storage costs.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data protection operations. More particularly, at least some embodiments of the invention relate to systems, hardware, software, computer-readable media, and methods for performing data protection operations including, but not limited to, data PUT operations, locking operations (e.g., lock during write), lock extension operations (e.g., extend before expiry), garbage collection operations, deletion operations, copy forward operations, cost management operations, deduplication operations, or the like or any combination thereof.

Embodiments of the invention are discussed in the context of objects. However, embodiments of the invention can be applied to block, chunks, files, and other data forms and storage structures, storage devices, and data representations. In general, example embodiments of the invention relate to setting protection duration, also referred to herein as a lock extension value. The lock extension value relates to a period of time or refers to the duration during which an object is locked. When an object is locked in one example, the object can be deleted (e.g., made inaccessible, non-viewable, or the like) from a storage system, but cannot be removed from the storage system. In one example, the deletion of locked objects is possible when cloud or storage providers mandate that versioning be enabled. As a result, an entity may be responsible for storage costs of objects and deleted object until the deleted objects are permanently removed from the storage system after the lock expires.

As previously stated, costs in a storage system, such as a datacenter or cloud-based storage system, can incur costs in different manners. Costs are incurred based on the amount of storage consumed by the stored objects (including deleted objects). Costs can also be incurred when using compute or processing resources. For example, performing garbage collection operations to remove objects incurs cost and performing lock extension operations to extend the protection duration may also incur cost.

Embodiments of the invention thus relate to setting or optimizing the lock extension value in order to control these costs. More specifically, the lock extension value is set in a manner that balances the cost of performing garbage collection operations, the cost of lock extension operations, and the cost of storing locked objects. In one example, the lock extension value is dynamically and/or automatically changed or adapted over time in order to account for changes due to, by way of example, data ingestion and garbage collection operations.

Embodiments of the invention, in one example determine or derive a lock extension value in a data protection system (e.g., a deduplication system) based on parameters including one or more of an amount of data cleaned (removed) from the storage system during each execution of a garbage collection operation, the garbage collection operation schedule, the cost of performing a lock extension operation, and the cost of the cloud storage.

Figure 1:
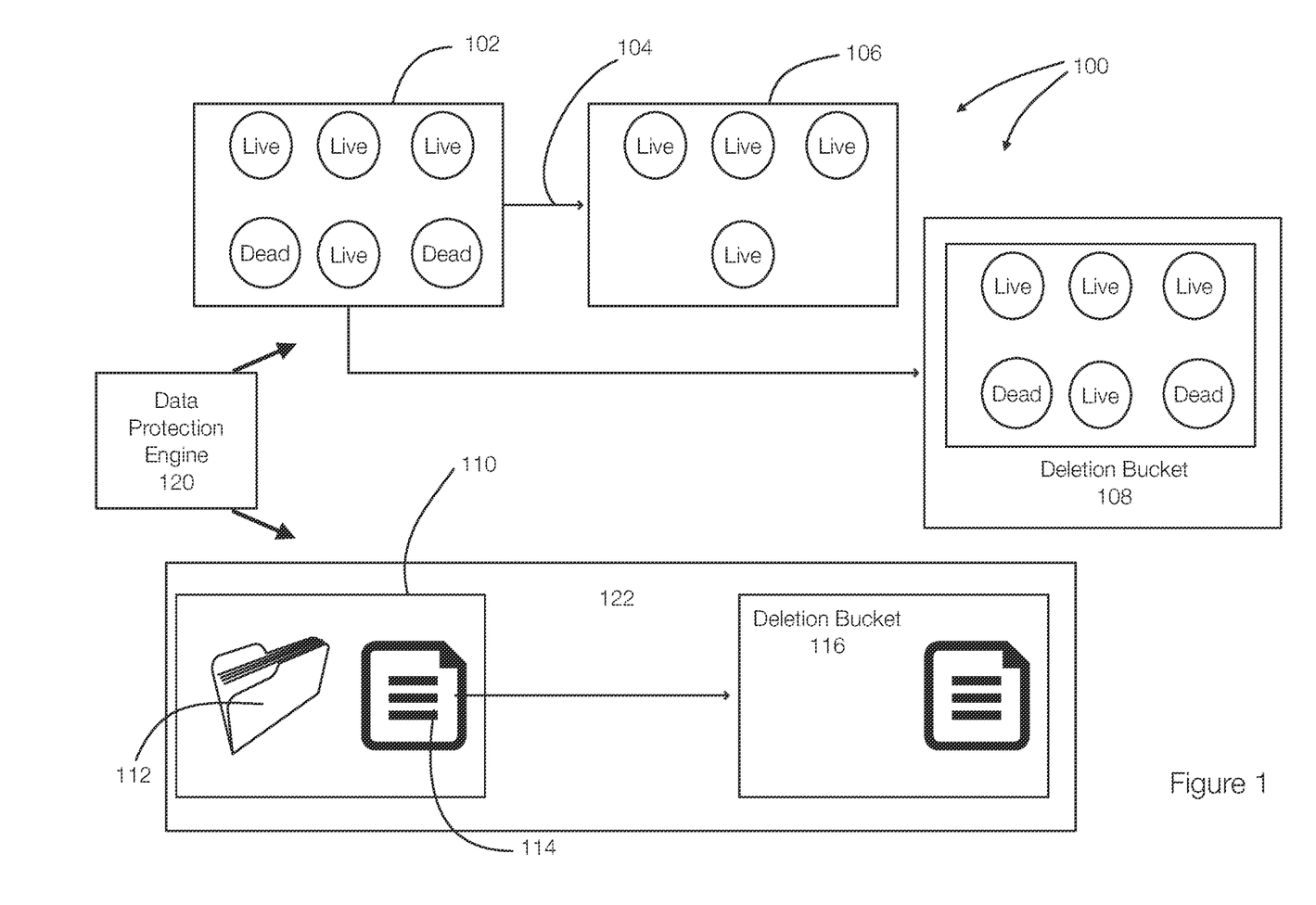
FIG. 1 discloses aspects of deleting objects from an object storage system.

FIG. 1 discloses aspects of controlling costs in a storage system and FIG. 1 discloses aspects of garbage collection operations. Performing a garbage collection operation may also be referred to as a garbage collection cycle. FIG. 1 discloses a data protection engine 120 that is configured to perform operations including a garbage collection operation and a lock extension operation. In this example, the storage system 100 is illustrated in the context of a deduplicated storage system.

In an example deduplication system, objects are often chunked into smaller or suitably sized pieces and deduplicated (this may be done on an object basis as well). A recipe is maintained that allows the object to be reconstructed. When an object is requested, the object's recipe is consulted to identify the object's chunks. These chunks are retrieved, and the object is reconstructed. The chunks (or segments, blocks, etc.) corresponding to multiple objects may be stored together. In one example, a group of chunks is referred to as a compression region. A compression region may store chunks corresponding to multiple objects. The objects or chunks in a compression region may be encrypted and/or compressed. However, the objects or chunks may be neither encrypted nor compressed. To conserver storage space, however, the compression regions may be compressed. As a result, cleaning a compression region to be decompressed first.

Over time, some of the chunks in a given compression region are no longer referenced by any recipes. These chunks are dead chunks and can be deleted. Live chunks refer to chunks that are referenced by valid or live recipes and may still be needed for restore operations, duplication operations, or the like. Over time, it may be desirable to clean a compression region to remove the dead chunks by performing a garbage collection operation. The garbage operation can be performed based on a ratio of dead/live chunks, periodically or in a scheduled manner, or the like.

FIG. 1 illustrates a compression region 102 that includes live chunks and dead chunks. To clean the compression region 102, the data protection engine 120 performs a garbage collection operation, which may include a copy forward operation. In a copy forward operation, the live chunks in the compression region 102 are copied forward 104 into a new compression region 106. After the live chunks have been copied forward into a new compression region 106, the old compression region 102 may be deleted or placed in a deletion bucket 108.

FIG. 1 illustrates that, by performing the copy forward operation, the storage consumed by the dead chunks is freed while the live chunks are moved to a new compression region that is not burdened with dead chunks. This process may be repeated over time as chunks become stale.

As previously stated, however, the dead chunks may be associated with a lock and, as a result, cannot be removed until the associated lock expires. Thus, even if the dead chunks (or deleted objects) have been deleted from the storage, the deleted objects are still present in the deletion bucket 108 or in the cloud storage bucket or container, etc., or in the computing system. Consequently, the deleted objects still consume storage space and incur the associated storage cost. The cost may depend on the protection duration, which may be represented by a lock extension value. The deleted chunks or objects cannot be removed until the protection duration expires.

This garbage collection operation is also illustrated in a different manner in the flow 122. In the flow 122, the objects in storage are represented in a user interface 122. The user interface 110 illustrates that the storage includes a folder 112 of objects and an object 114 (e.g., a file). In this example, the object 114 may be deleted, which may include placing the object or a reference to the object 114 in a deletion bucket. The manner in which an object is deleted may depend on the computing environment and can occur in different manners. Deleting an object may not require a deletion bucket. Alternatively, the file 114 is marked or otherwise scheduled for deletion and will be removed when the protection duration expires. When the protection duration expires, the object 114 (or the chunks corresponding to the object 114 in one example) are deleted or removed such that storage is no longer consumed by the object 114.

More specifically, deleting an object may not result in the deletion of the object or of the object's chunks that are dead. If one or more of the object's chunks also correspond to other objects, the chunks that are associated with other objects are not deleted as they are still live. If some of the chunks associated with the object 114 are not referenced by any other object, those chunks may be marked as dead chunks and deleted. The deletion operation may clean the compression regions as described.

The protection duration or lock extension value has an impact on the storage costs because chunks or objects cannot be removed (even if dead or from the deletion bucket in one example) until the lock has expired.

The garbage collection operation and the lock extension operation, which is performed to extend the locks on objects, also incur compute related costs. Setting the lock extension value can impact the cost of storage and the compute costs in the storage system 100.

In one example, the lock extension value represents how long the objects are locked. For example, if the lock extension value is 30 days and the lock of an object is expiring, renewing the lock extends the time that the object is stored in the storage system. In one example, the object will be stored for at least 30 more days—the protection duration or lock extension value is 30 days. If the object is deleted after 15 days, the object may remain in a deletion bucket, but may not be removed until the lock expires. Thus, the deleted object may be associated with storage costs for 15 days after being deleted in this example.

In one example, both the garbage collection operation and the lock extension operation may operate according to a schedule. The garbage collection operation, for example, may operate weekly. The lock extension operation operates according to the lock extension value. If the lock extension value is 30 days, the lock extension operation operates every thirty days. Embodiments of the invention may change the lock extension value, for example by selecting a different lock extension value, and this impacts the timing of the lock extension operation to coincide with the current lock extension value.

Figure 2:
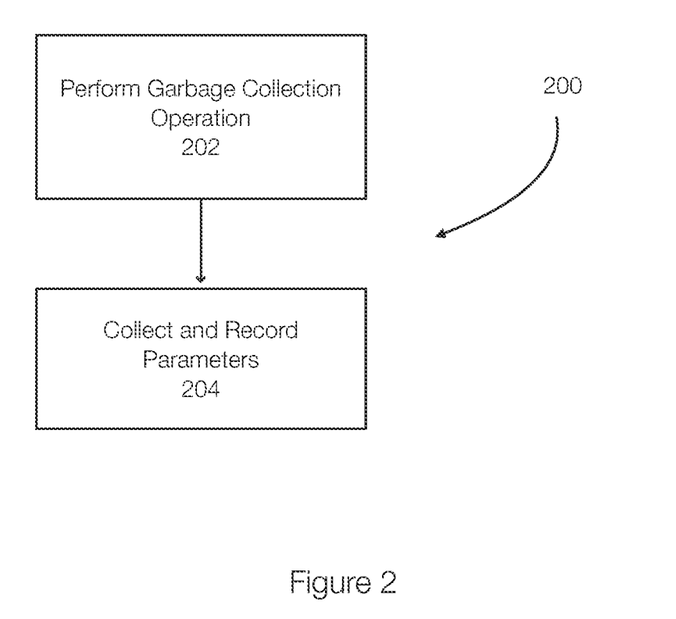
FIG. 2 discloses aspects of performing a garbage collection operation.
Figure 3:
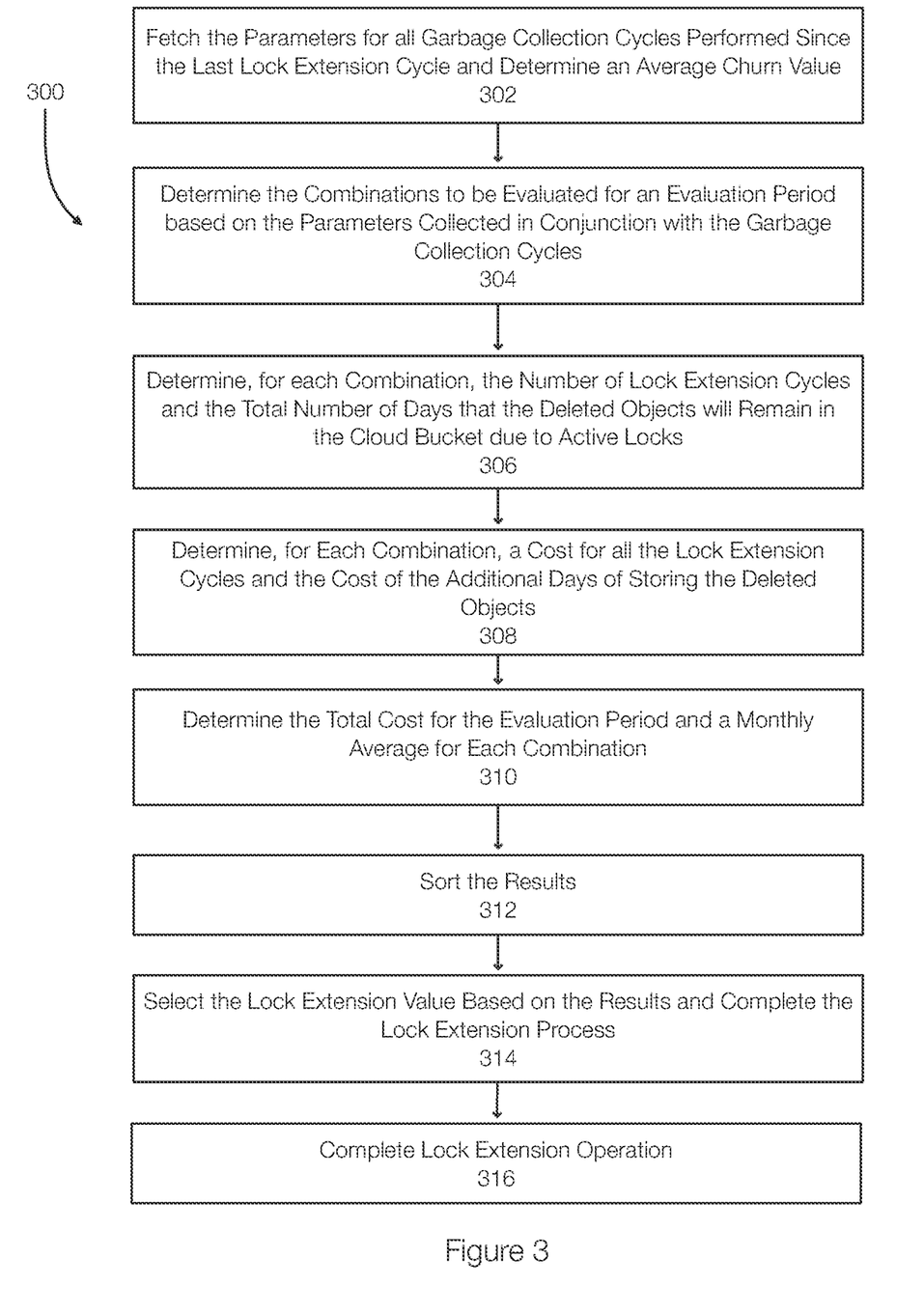
FIG. 3 discloses aspects of performing a lock extension operation.

FIGS. 2 discloses aspects of a garbage collection operation or cycle, and FIG. 3 discloses aspects of a lock extension operation. The methods 200 and 300 may be related at least in the sense that the method 200 may generate data or values that are used during the method 300. The methods 200 and 300 may be performed by a data protection system or a data protection engine, appliance, server, or the like.

Before performing the methods 200 and/or 300, it may be necessary to perform some configuration operations or identify certain variables or values. Because embodiments of the invention relate to controlling cost at least in the context of storage and processing, the method 200 and 300 may use the cost of cloud storage and the cost of performing a lock extension operation. By way of example only, the cost of cloud storage may be a fixed value (e.g., $0.023 per GB/month), unless changed by a storage provider. The cost of performing a lock extension operation may depend on the number of objects processed (e.g., $0.005 per 10,000 objects). The costs, however, may be determined in other forms (e.g., core usage, virtual machines used).

As previously stated, embodiments of the invention are related to controlling cost. Embodiments of the invention may, as a result, estimate the costs for a period of time, which is referred to herein as an evaluation period. The evaluation period is typically longer than the lock period. In one example, the evaluation period is 180 days, but the evaluation period may be shorter or longer. This is distinct from the schedule of the garbage collection operation and distinct from the schedule of the lock extension operation. The following discussion uses, by way of example only, a garbage collection operation schedule of one week, an initial lock extension value or protection value of 30 days, and an evaluation period of 180 days. In embodiments of invention, the analysis may change the lock extension value. Subsequent analysis of the cost may rely on the new lock extension value.

FIG. 2 discloses aspects of performing a garbage collection operation. When performing a garbage collection cycle, the garbage collection operation is performed 202. The garbage collection operation cleans up, for example, dead objects and copy-forwarded fragmented objects. At the end of the garbage collection operation, parameters are collected and recorded 204. The parameters collected for each cycle or run of the garbage collection operation may include the amount of data cleaned up (the churn), the remaining number of days before the lock expires for the objects deleted by the garbage collection cycle (the number of days the deleted objects will remain in the cloud bucket before being deleted permanently by an object life cycle policy or manually), and the number of objects cleaned up by the garbage collection cycle. The method 200 may be performed on a schedule, such as weekly by way of example only.

FIG. 3 discloses aspects of a lock extension operation, which may include determining a lock extension value. The method 300 may be performed regularly or according to a schedule. However, the schedule of the method 300 (or portions thereof) may change at least because one aspect of the lock extension operation is to determine a new lock extension value. The next lock extension operation is performed when the current lock or protection duration ends. Embodiments of the invention allow lock extension operation cycle to be adaptive to current or anticipated conditions including anticipated or actual cost.

When a lock extension operation (e.g., the method 300) is initiated, the parameters of the garbage collection cycles performed since the last lock extension operation are collected and an average churn is determined 302.

For example, if the garbage collection operation is scheduled to be performed weekly and the current lock extension value or protection duration is 30 days, there will be about 4 garbage collection cycles before the next lock extension operation is performed. If the churn values for each of those garbage collection cycles were 10 TB, 11 TB, 9 TB and 12 TB, the average churn is 10.5 TB.

Generally, churn values increase linearly over time, although this may be impacted by storage capacity. The churn values may differ, however, when there are substantial workload changes such as adding new workloads, expiring old workloads, removing workloads, changing data retention periods, or the like or combination thereof.

Figure 4:
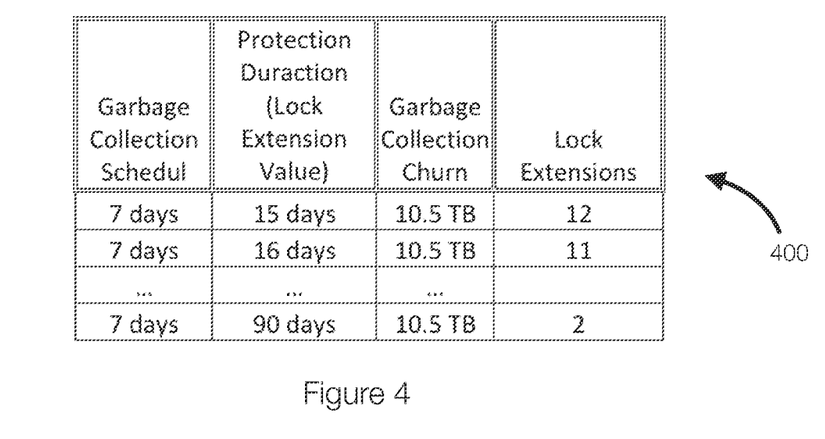
FIG. 4 discloses aspects of selecting a lock extension value.

Next, the combinations to be evaluated for an evaluation period are determined 304 based in part on the parameters generated when the garbage collection cycles were performed. FIG. 4 discloses aspects of the combinations being evaluated. In this example, the table 400 illustrates that a combination is generated for each lock extension value being evaluated. The number of lock extension values may be bounded by a minimum and a maximum, which can be changed. In this example, the minimum lock extension value is 15 days, and the maximum lock extension value is 90 days.

Over an evaluation period of 180 days, 12 lock extension operations or cycles are expected when the lock extension value is 15 days. The number of lock extension operations can be determined or estimated by dividing the evaluation period by the lock extension value for each of the combinations. This number is usually rounded down.

$$\text{Extension Operations in Evaluation Period} = \frac{\text{Evaluation Period}}{\text{Lock Extension Value}}$$

For example, the parameters generated in conjunction with performing the garbage collection operation since the last lock extension operation are fetched and the combinations are determined. These parameters include, by way of example:

| | |
|---|---|
| the garbage collection schedule | 1 week; |
| the garbage collection churn (average) | 10.5 TB; |
| lock extension value | 14 to 90 days (min to max). |

In this example, the minimum and maximum lock extension values may vary from a configurable minimum and maximum value. For each lock extension value, the number of lock extensions are determined. For example, assuming that the method 300 is performed with respect to a 180 day window and the lock extension value is 30, about 5 lock extension operations are expected. If the window is 210 days and the lock extension value is 20, about 10 lock extension operations are expected.

Thus, after determining 304 the combinations to be evaluated for an evaluation period, the number of lock extension cycles are determined 306. At the same time, the total number of days that the deleted object will remain in the storage (e.g., the cloud bucket) due to active locks is determined 306.

More specifically, determining the number of lock extensions for an evaluation period (the 180 day window in this example), may also include determining the number of days that the data deleted by the garbage collection operation will remain in the cloud bucket.

For example, assume that the parameters are as follows:

| | |
|---|---|
| garbage collection schedule | 1 week; |
| average churn | 10.5 TB; |
| lock extension value | 30 days. |

In this iteration for a lock extension value of 30 days, the following analysis occurs:

garbage collection on run 1 on $7^{th}$ day: churn 10.5 TB; 23 days till lock expires; garbage collection on run 2 on $14^{th}$ day: churn 10.5 TB; 16 days till lock expires; garbage collection on run 3 on $21^{st}$ day: churn 10.5 TB; 9 days till lock expires; garbage collection on run 4 on $28^{th}$ day: churn 10.5 TB; 2 days till lock expires;

In this example, 10.5 TB would remain in the bucket for an additional 50 days (23 days+16 days+9 days+2 days). In this example, the 10.5 TB associated with the 23 days is different from the 10.5 TB associated with the 16 days. This is because each garbage collection cycle deletes different data. As a result, the total number of days deleted, but locked data, is stored (50 days) can be larger than the lock extension value (30 days for this iteration).

There may be a situation where the garbage collection and the lock extension operation coincide or occur on the same day. In this case and because the lock extension may be performed before the garbage collection operation can delete the data, the number of days till the lock expires will be the corresponding lock extension value. This may depend on which iteration is being processed.

Using these values, the cost is determined 308 for each combination of parameters. This includes a cost for the additional days that the deleted objects remain in the cloud bucket due to the active lock and the cost of the lock extension operations. The following example assumes a 256 TB Power Protect Data Domain Virtual Edition (DDVE).

The cost for executing lock extensions for an evaluation period is the number of extensions times the cost. If the cost is $300 to perform a lock extension operation (the compute resources cost as well as the cloud operations cost), then the cost for 5 lock extension operations is $1500.00.

The following example also considers the total number of possible objects rather than the actual number of objects present in storage. The cost for the additional days of storage is as follows:

If the cost of storage is $0.023 per Gigabyte (GB) per month, then the additional cost for the 50 days in which deleted objects (worth 10.5 TB of size) are stored is:

$$\left(\frac{(10.5*1024)*\$0.023)}{30 \text{ days}}\right)*50 \text{ days} = \$412.60$$

This demonstrates that, for the next 30 days, the additional storage cost is estimated to be about $412.60. Extending this to 180 days, with the assumption that there will be the equivalent of 50 days of storage for each 30 day period, yields a total additional storage cost of about $2475.60.

Figure 5:
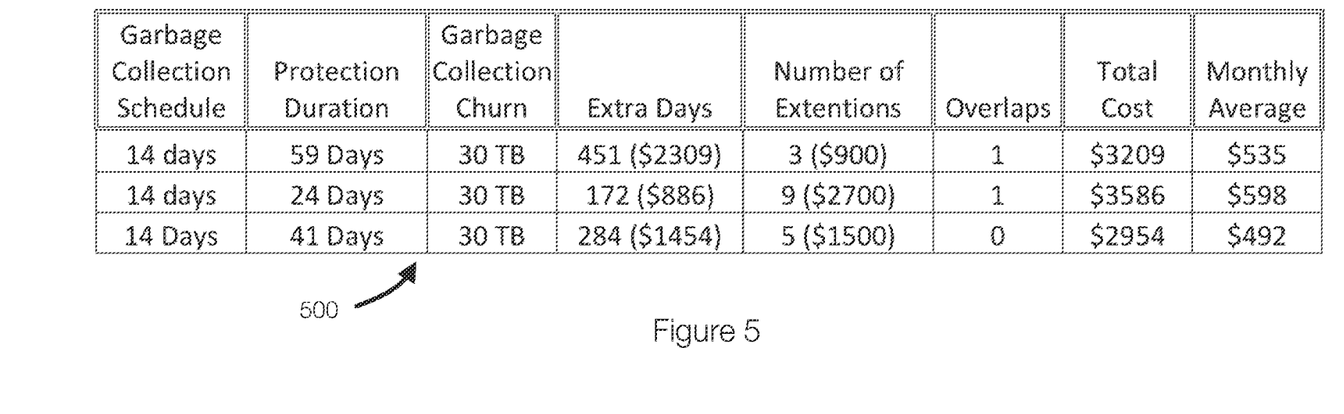
FIG. 5 discloses additional aspects of selecting a lock extension value.

Once these values are determined, the total cost for the evaluation period and an average cost of each combination is determined 310. FIG. 5 discloses aspects of the total cost and the average cost. The table 500 illustrates the monthly average for 3 combinations. The table 500 only illustrates selected iterations and includes different parameters (e.g., 14 day garbage collection cycle). As previously stated, an iteration may be performed for every protection duration value from the minimum to the maximum values inclusively.

In this example, three different protection duration or lock extension values are illustrated: 59, 24, and 41 days. The cost of the associated storage (extra days of storing the deleted data), the cost of the number of extension operations to be performed (the number of extensions), the total cost and the monthly cost average are illustrated in the table 500.

Returning to FIG. 3 the table or results of the combination analyses may be sorted 312 based on the monthly average. This may sort from lowest to highest based on the monthly cost. Next, the lock extension value associated with the lowest monthly cost is selected 314.

The lock extension operation is then completed 316 based on the new lock extension value. The locks on the objects in the storage are renewed using the new lock extension value, which may or may not be different from the previous lock extension value.

This allows the cost to be dynamically and automatically controlled by selecting, based on the method 300, a new lock extension value. If the garbage collection schedule is changed or other factors or changes occur, the next lock extension operation will determine a new lock extension value that accounts for those changes.

Embodiments of the invention advantageously determine a protection duration for locking objects in the cloud. This relieves administrators from having to determine the lock extension value that will keep costs at reduced or minimum values. In addition, embodiments of the invention can adapt to changes in garbage collection churn and garbage collection schedule changes.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, garbage collection operations, lock extension operations, cost evaluation operations, cost optimization operations, or the like or combination thereof.

At least some embodiments of the invention provide for the implementation of the disclosed functionality in existing backup platforms, examples of which include the Dell-EMC NetWorker and Avamar platforms and associated backup software, and storage environments such as the Dell-EMC Power Protect DataDomain storage environment. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, Vmware Cloud, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VM).

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines, containers, or virtual machines (VM), though no particular component implementation is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: retrieving garbage collection cycle parameters for all garbage collection operations performed in a storage system since a previous lock extension operation performing in the storage system, determining combinations of parameters to evaluate, wherein each of the combinations is associated with a lock extension value, determining a cost of each combination, selecting a new lock extension value associated with a combination having a lowest cost, and performing a current lock extension operation using the new lock extension value.

Embodiment 2. The method of embodiment 1, further comprising performing the garbage collection operations and collecting parameters for each of the garbage collection operations, the parameters including a churn, days left for locks on the deleted objects to expire, and a number of objects cleaned, wherein the churn describes a total size of objects of objects deleted.

Embodiment 3. The method of embodiment 1 and/or 2, further comprising determining an average churn for the data collection operations.

Embodiment 4. The method of embodiment 1, 2, and/or 3, wherein each of the combinations includes a schedule of the garbage collection operations, the average churn, and a lock extension value, wherein the lock extension value of each combination is different.

Embodiment 5. The method of embodiment 1, 2, 3, and/or 4, further comprising determining, for each of the combinations, a number of lock extension operations for an evaluation period based on a current lock extension value in the combination, a first cost of storing the deleted objects for additional days based on the current lock extension value, and a second cost of performing the number of lock extension operations.

Embodiment 6. The method of embodiment 1, 2, 3, 4, and/or 5, further comprising determining at least one of a total cost for each of the combinations and a periodic cost for each of the combinations.

Embodiment 7. The method of embodiment 1, 2, 3, 4, 5, and/or 6, wherein the periodic cost is monthly or 30 days.

Embodiment 8. The method of embodiment 1, 2, 3, 4, 5, 6, and/or 7, further comprising selecting, as the new lock extension value, a lock extension value in a combination with a lowest periodic cost.

Embodiment 9. The method of embodiment 1, 2, 3, 4, 5, 6, 7, and/or 8, wherein the first cost is based on a storage cost per gigabyte per month and wherein the second cost is based on the cost of the number of lock extension operations.

Embodiment 10. The method of embodiment 1, 2, 3, 4, 5, 6, 7, 8, and/or 9, further comprising determining another new lock extension value each time the lock extension operation is performed, wherein each lock extension operation accounts for changes in workload and operation schedules.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
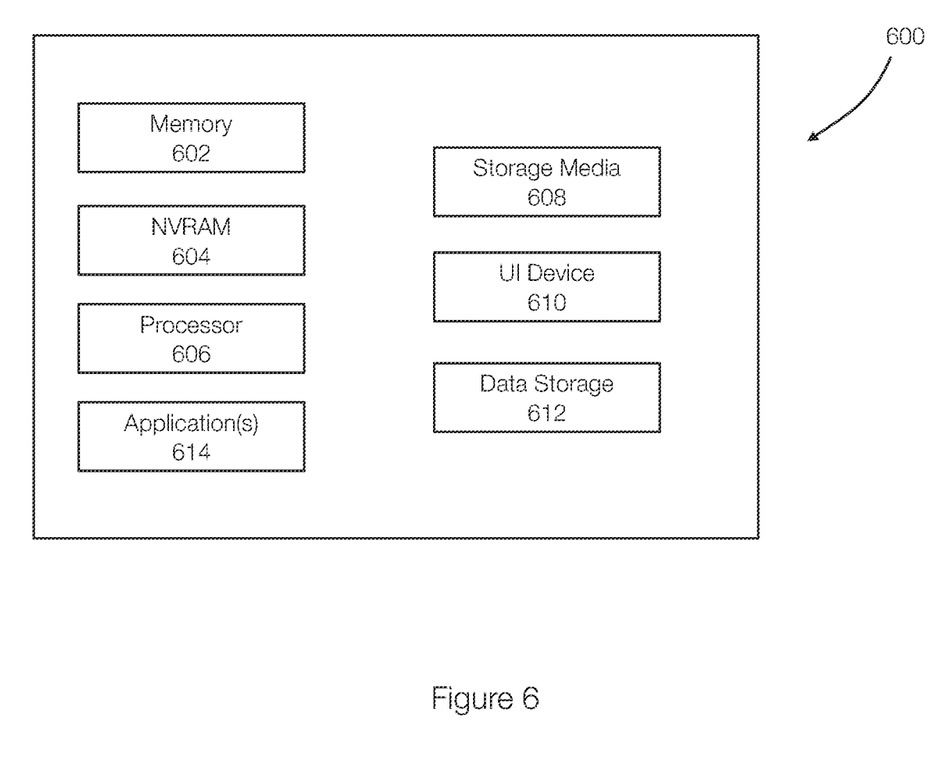
FIG. 6 discloses aspects of a computing device, system, or entity.

With reference briefly now to FIG. 6, any one or more of the entities disclosed, or implied, the Figures and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random-access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid-state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
retrieving garbage collection cycle parameters for all garbage collection operations performed in a storage system since a previous lock extension operation performing in the storage system;
determining combinations of parameters to evaluate, wherein each of the combinations is associated with a lock extension value;
determining a cost of each combination;
selecting a new lock extension value associated with a combination having a lowest cost; and
performing a current lock extension operation using the new lock extension value.

2. The method of claim 1, further comprising performing the garbage collection operations and collecting parameters for each of the garbage collection operations, the parameters including a churn, days left for locks on the deleted objects to expire, and a number of objects cleaned, wherein the churn describes a total size of objects deleted.

3. The method of claim 2, further comprising determining an average churn for the data collection operations.

4. The method of claim 1, wherein each of the combinations includes a schedule of the garbage collection operations, the average churn, and a lock extension value, wherein the lock extension value of each combination is different.

5. The method of claim 1, further comprising determining, for each of the combinations, a number of lock extension operations for an evaluation period based on a current lock extension value in the combination, a first cost of storing the deleted objects for additional days based on the current lock extension value, and a second cost of performing the number of lock extension operations.

6. The method of claim 5, further comprising determining at least one of a total cost for each of the combinations and a periodic cost for each of the combinations.

7. The method of claim 6, wherein the periodic cost is monthly or 30 days.

8. The method of claim 6, further comprising selecting, as the new lock extension value, a lock extension value in a combination with a lowest periodic cost.

9. The method of claim 5, wherein the first cost is based on a storage cost per gigabyte per month and wherein the second cost is based the cost of the number of lock extension operations.

10. The method of claim 1, further comprising determining another new lock extension value each time the lock extension operation is performed, wherein each lock extension operation accounts for changes in workload and operation schedules.

11. A non-transitory storage medium having stored therein instructions that are executable by one or more hardware processors to perform operations comprising:
retrieving garbage collection cycle parameters for all garbage collection operations performed in a storage system since a previous lock extension operation performing in the storage system;
determining combinations of parameters to evaluate, wherein each of the combinations is associated with a lock extension value;
determining a cost of each combination;
selecting a new lock extension value associated with a combination having a lowest cost; and
performing a current lock extension operation using the new lock extension value.

12. The non-transitory storage medium of claim 11, further comprising performing the garbage collection operations and collecting parameters for each of the garbage collection operations, the parameters including a churn, days left for locks on the deleted objects to expire, and a number of objects cleaned, wherein the churn describes an amount of objects deleted.

13. The non-transitory storage medium of claim 12, further comprising determining an average churn for the data collection operations.

14. The non-transitory storage medium of claim 11, wherein each of the combinations includes a schedule of the garbage collection operations, the average churn, and a lock extension value, wherein the lock extension value of each combination is different.

15. The non-transitory storage medium of claim 11, further comprising determining, for each of the combinations, a number of lock extension operations for an evaluation period based on a current lock extension value in the combination, a first cost of storing the deleted objects for additional days based on the current lock extension value, and a second cost of performing the number of lock extension operations.

16. The non-transitory storage medium of claim 15, further comprising determining at least one of a total cost for each of the combinations and a periodic cost for each of the combinations.

17. The non-transitory storage medium of claim 16, wherein the periodic cost is monthly or 30 days.

18. The non-transitory storage medium of claim 16, further comprising selecting, as the new lock extension value, a lock extension value in a combination with a lowest periodic cost.

19. The non-transitory storage medium of claim 15, wherein the first cost is based on a cost per gigabyte per month and wherein the second cost is based on the number of lock extension operations.

20. The non-transitory storage medium of claim 11, further comprising determining another new lock extension value each time the lock extension operation is performed, wherein each lock extension operation accounts for changes in workload and operation schedules.

* * * * *